US009235887B2

(12) United States Patent
Buckler et al.

(10) Patent No.: US 9,235,887 B2
(45) Date of Patent: Jan. 12, 2016

(54) CLASSIFICATION OF BIOLOGICAL TISSUE BY MULTI-MODE DATA REGISTRATION, SEGMENTATION AND CHARACTERIZATION

(71) Applicants: vascuVis Inc., Wenham, MA (US); Rutgers, The state University of New Jersey, New Brunswick, NJ (US); Trustees of Boston University, Boston, MA (US); The Trustees Of The University of Pennsylvania, Philadelphia, PA (US)

(72) Inventors: Andrew Buckler, Wenham, MA (US); Anant Madabhushi, Beachwood, OH (US); James Hamilton, Boston, MA (US); Shannon Agner, Cherry HIll, NJ (US); Mark Rosen, Bala Cynwyd, PA (US)

(73) Assignees: Elucid Bioimaging, Inc., Wenham, MA (US); Rutgers, The State University of New Jersey, New Brunswick, NJ (US); Trustees of Boston University, Boston, MA (US); The Trustees of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 13/732,674

(22) Filed: Jan. 2, 2013

(65) Prior Publication Data

US 2013/0202173 A1 Aug. 8, 2013

Related U.S. Application Data

(63) Continuation-in-part of application No. 12/867,349, filed as application No. PCT/US2009/034505 on Feb. 19, 2009.

(60) Provisional application No. 61/029,697, filed on Feb. 19, 2008.

(51) Int. Cl.
*G06K 9/00* (2006.01)
*G06T 7/00* (2006.01)

(52) U.S. Cl.
CPC .............. *G06T 7/0012* (2013.01); *G06T 7/0083* (2013.01); *G06T 7/0087* (2013.01);
(Continued)

(58) Field of Classification Search
None
See application file for complete search history.

(56) References Cited

U.S. PATENT DOCUMENTS

| 5,551,431 A | 9/1996 | Wells, III et al. |
| 6,317,617 B1 | 11/2001 | Gilhuijs et al. |

(Continued)

OTHER PUBLICATIONS

Wikipedia: the free encyclopedia, "Minimum redundancy feature selection", Oct. 10, 2007.*

(Continued)

*Primary Examiner* — Nirav G Patel
*Assistant Examiner* — Raphael Schwartz
(74) *Attorney, Agent, or Firm* — RatnerPrestia

(57) ABSTRACT

A method and apparatus for classifying possibly vulnerable plaques from sets of DCE-MRI images includes receiving a set of MRI slice images obtained at respectively different times, where each slice image includes voxels representative of at least one region of interest (ROI). The images are processed to determine the boundaries of the ROIs and the voxels within the identified boundaries in corresponding regions of the images from each time period are processed to extract kinetic texture features. The kinetic texture features are then used in a classification process which classifies the ROIs as vulnerable or stable.

21 Claims, 9 Drawing Sheets

(52) U.S. Cl.
CPC ..... *G06T7/0089* (2013.01); *G06T 2207/10096* (2013.01); *G06T 2207/20116* (2013.01); *G06T 2207/30068* (2013.01)

(56) References Cited

U.S. PATENT DOCUMENTS

| | | | |
|---|---|---|---|
| 7,657,299 | B2 | 2/2010 | Huizenga et al. |
| 8,068,894 | B2 | 11/2011 | Huizenga et al. |
| 8,229,201 | B2 | 7/2012 | Licato |
| 8,406,488 | B2 | 3/2013 | Sirohey et al. |
| 2004/0066960 | A1 | 4/2004 | McLaren et al. |
| 2004/0098200 | A1 | 5/2004 | Wentland et al. |
| 2005/0207630 | A1 | 9/2005 | Chan et al. |
| 2006/0018548 | A1 | 1/2006 | Chen et al. |
| 2006/0274928 | A1 | 12/2006 | Collins et al. |
| 2007/0165920 | A1* | 7/2007 | Gering et al. ......... 382/128 |
| 2008/0031815 | A1 | 2/2008 | Chen et al. |
| 2008/0056550 | A1 | 3/2008 | Kadir et al. |
| 2008/0122842 | A1 | 5/2008 | Sirohey et al. |
| 2010/0204563 | A1 | 8/2010 | Stodilka et al. |
| 2011/0026798 | A1 | 2/2011 | Madabhushi et al. |
| 2011/0170759 | A1 | 7/2011 | Bjornerud et al. |
| 2011/0206257 | A1 | 8/2011 | Qanadli et al. |

OTHER PUBLICATIONS

Texas Heart Institute, "Coronary Artery Disease", Feb. 4 2007, Archive.org Wayback Machine.*
Falk, Erling, Prediman K. Shah, and Valentin Fuster. "Coronary plaque disruption." Circulation 92.3 (1995): 657-671.*
Anderson, Russell W., et al. "Automated classification of atherosclerotic plaque from magnetic resonance images using predictive models." Biosystems 90.2 (2007): 456-466.*
Kuhl, Christiane Katharina, et al. "Dynamic breast mr imaging: Are signal intensity time course data useful for differential diagnosis of enhancing lesions? 1." Radiology 211.1 (1999): 101-110.*
Xie, Xianghua, and Majid Mirmehdi. "MAC: Magnetostatic active contour model." Pattern Analysis and Machine Intelligence, IEEE Transactions on 30.4 (2008): 632-646.*
Fatakdawala, Hussain, et al. "Expectation-maximization-driven geodesic active contour with overlap resolution (emagacor): Application to lymphocyte segmentation on breast cancer histopathology." Biomedical Engineering, IEEE Transactions on 57.7 (2010): 1676-1689.*
Lucht, Robert, Stefan Delorme, and Gunnar Brix. "Neural network-based segmentation of dynamic MR mammographic images." Magnetic resonance imaging 20.2 (2002): 147-154.*
Agner, Shannon C., et al. "Textural kinetics: a novel dynamic contrast-enhanced (DCE)-MRI feature for breast lesion classification." Journal of digital imaging 24.3 (2011): 446-463.*
Vulnerable Plaque, Wikipedia: the free encyclopedia, Oct. 29, 2012.*
Woods et al., Malignant-Lesion Segmentation Using 4 Co-Occurrence Texture Analysis applied to Dynamic Contrast-Enhanced Magnetic Resonance Breast Image Data', Journal of Magnetic Resonance Imaging, 25:495-501, 2007.
Bryan et al., "Ductal carcinoma in situ with basal-like phenotype: a possible precursor to invasive basal-like breast cancer", Modern Pathology, pp. 617-621, 2006.
M.R. Turner, "Texture Discrimination by Gabor Functions", Biol. Cybern. 55, 71-82, 1986.
Kapur et al., "Segmentation of brain tissue from magnetic resonance images", Medical Image Analysis, vol. 1, No. 2, pp. 109-127, 1996.
Yan et al., "Graph Embedding: A General Framework for Dimensionality Reduction", Proceedings of the 2005 IEEE Computer Society Conference on Computer Vision and Pattern Recognition, 2005.
Office Action for U.S. Appl. No. 12/867,349, filed Oct. 19, 2010, mailed Jan. 29, 2013.
Xianghua et al., "Magnetostatic field for Active Contour Model: A Study in Convergence", Proceeding of the 17th British Machine Vision Conference, pp. 127-136, Sep. 2006.
International Search Report dated Apr. 29, 2009.
International Preliminary Report on Patentability for International Appln. No. PCT/US2009/034505, dated Aug. 24, 2010.
Written Opinion for International Appln. No. PCT/US2009/034505, dated Apr. 7, 2009.
Office Action for Appln. No. 12/867,349, filed Oct. 19, 2010, mailed Dec. 3, 2013.
International Search Report and Written Opinion issued in related International Application No. PCT/US2013/077980, dated Apr. 21, 2014.
Revel et al., "Gd-DTPA Contrast Enhancement and Tissue Differentiation in MR Imaging of Experimental Breast Carcinoma", Radiology, vol. 158, No. 2, 1986, pp. 319-323.
Mussurakis et al., "Dynamic MRI of Invasive Breast Cancer: Assessment of Three Region-of-Interest Analysis Methods", Journal of Computer Assisted Tomography, vol. 21(3), May/Jun. 1997, pp. 431-438.
Mussurakis et al., "Observer variability in the interpretation of contrast enhanced MRI of the breast", The British Journal of Radiology, 69, No. 827 1996, pp. 1009-1016.
Gribbestad et al., "Comparative Signal Intensity Measurements in Dynamic Gadolinium-enhanced MR Mammography", JMRI, vol. 4, 1994; pp. 477-480.
International Report on Patentability and Written Opinion issued in related International Application No. PCT/US2013/077980, dated Jul. 7, 2015.

* cited by examiner

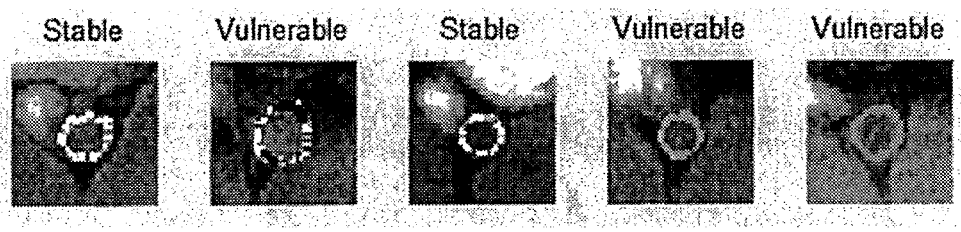
FIG. 7A
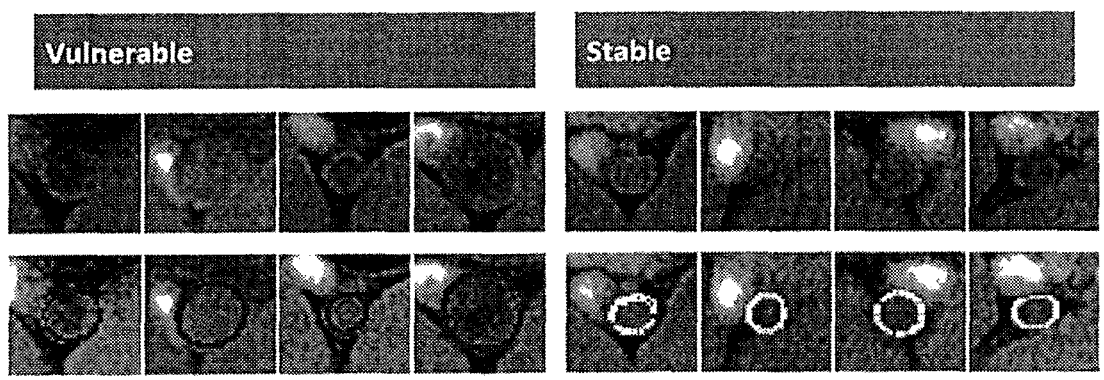
FIG. 7B                    FIG. 7C

CLASSIFICATION OF BIOLOGICAL TISSUE BY MULTI-MODE DATA REGISTRATION, SEGMENTATION AND CHARACTERIZATION

The present application is a Continuation in Part application of U.S. application Ser. No. 12/867,349 filed Oct. 19, 2010, which claims the benefit of PCT International application no. PCT/US2009/034505 filed Feb. 19, 2009, which claims the benefit of priority from U.S. provisional application No. 61/029,697 filed Feb. 19, 2008 the contents of which are incorporated herein by reference.

STATEMENT REGARDING FEDERALLY SPONSORED RESEARCH

The present invention was supported in part by a grant from the National Institutes of Health (NIH) (Grant No. P50 HL083801). The United States Government has certain rights to the invention.

BACKGROUND OF THE INVENTION

Magnetic resonance imaging (MRI) of the breast is quickly becoming an important component of breast cancer screening in the United States. The American Cancer Society revised its MRI screening guidelines in 2007 to include women with a 20 to 25 percent increased lifetime risk, including family history of breast and ovarian cancers or a history of prior treatment for Hodgkin's disease. MRI has become a tool for breast cancer screening because of its advantages over mammography and ultrasound. First, breast MRI is more sensitive than x-ray mammography and ultrasound and thus may be used to detect lesions that would otherwise remain undetected. Second, MRI has been shown to be advantageous in screening women with dense breast tissue, which is common in younger patients. Third, and likely most importantly, the dynamic contrast enhanced (DCE) component of DCEMRI provides information about vascularity of a lesion that is more difficult to obtain using x-ray mammography or ultrasound.

Triple negative (TN) breast cancer has recently gained much attention in the field of breast cancer research. TN breast cancer is a molecular subtype that lacks expression of the estrogen receptor, progesterone receptor, and the HER2 receptor. Because of its lack of receptor expression, targeted therapies are ineffective, and chemotherapy is currently the only treatment available. TN breast cancer is also particularly aggressive and accounts for 12% to 26% of all breast cancers, most often occurring in young patients and African-American patients. The research community has become interested in TN breast cancer because of its particularly aggressive clinical course and lack of targeted therapies. Studies examining the pathological phenotype have revealed a heterogeneous group of breast cancers that often present as interval cancers, presenting in the months in between annual breast cancers screenings. This clearly suggests the need for greater exploration into the detection methods and biological understanding of TN breast cancers. Studies have shown that x-ray mammography is less effective in TN breast cancer screening than DCE-MRI due to the greater sensitivity of DCE-MRI in detecting TN and basal-like breast cancer phenotypes. A similar pattern of enhancement, described as rim enhancement, was observed in both subtypes. Although, qualitative radiologic descriptors have been developed for small pilot studies in TN breast cancer cases, the inventors are unaware of any quantitative classification of the TN subtype.

SUMMARY OF THE INVENTION

The present invention is embodied in a method and apparatus for classifying possibly malignant lesions from sets of DCE-MRI images. The method includes receiving a set of MRI slice images obtained at respectively different times, where each slice image includes voxels representative of at least one lesion. The images are processed to determine the boundaries of the lesions and the voxels within the identified boundaries in corresponding regions of the images from each time period are processed to extract kinetic texture features. The kinetic texture features are used to drive a classification process wherein each lesion is identified as as malignant or benign. The malignant lesions are further classified to separate TN lesions from non-TN lesions.

The present invention is also embodied in a method and apparatus for classifying cardiovascular plaques from sets of DCE-MRI images. The method includes receiving a set of MRI slice images obtained at respectively different times, where each slice image includes voxels representative of at least one plaque. The images are processed to determine the boundaries of the plaque and the voxels within the identified boundaries in corresponding regions of the images from each time period are processed to extract kinetic texture features. The kinetic texture features are used to drive a classification process wherein each plaque is identified as stable or vulnerable.

BRIEF DESCRIPTION OF THE DRAWINGS

FIGS. 7A, 7B and 7C are images illustrating example classification results for various plaques, according to an embodiment of the invention.

DETAILED DESCRIPTION

Figure 1:
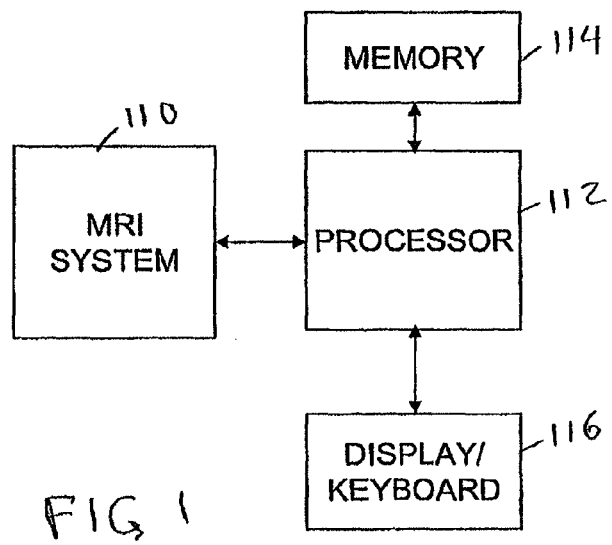
FIG. 1 is a block diagram of an exemplary DCE-MRI system suitable for use with an embodiment the subject invention.

While the embodiments of the subject invention described below concern the detection of breast tumors, it is contemplated that they may be applied generally to detecting and classifying possibly malignant lesions in other parts of the body based on DCE-MRI data. In addition, the invention may be applied to detect and classify non-malignant regions of interest (ROI) in a body.

For example, cardiovascular disease is one of the leading causes of death in the United States and world-wide. Atherosclerotic plaques are implicated in many acute cardiovascular events. Furthermore, asymptomatic vulnerable plaques may provide an even greater risk for these acute cardiovascular events. For example, stroke is currently the third largest killer in the United States, with millions dying every year. A more alarming statistic is that about 50% of women and about 64% of men who die from an acute atherosclerotic stroke report no prior symptoms.

Asymptomatic plaques, also known as vulnerable plaques, differ in composition from stable plaques. Vulnerable carotid plaques are liable to rupture, causing a thrombotic event that may lead to a stroke. Stable carotid plaques are more likely to cause increased stenosis in the artery, which restricts blood flow and consequently leads to their symptomatic nature.

The ability to non-invasively discriminate between plaque types may be of great medical benefit. Conventional medical technology is insufficient to screen patients for vulnerable plaques. While conventional Intravenous Ultrasound (IV-US) may be used for plaque discrimination, it is a highly invasive procedure that requires the patient to be put under general anesthesia and thus may be difficult to implement as a general screening tool. The significantly less invasive conventional carotid Doppler technique involves placing an imaging probe on the outside of the carotid arteries. Although carotid Doppler may not be invasive, it is typically incapable of differentiating between the plaque subtypes.

Referring to the example tumor classification use of the subject invention, due to the clinical nature of TN tumors, accurate and consistent identification of these specific tumors is desirable. A computer-aided diagnosis (CAD) system that could detect the TN radiologic phenotype would assist clinicians in therapeutic decision-making, monitoring therapy response, and increasing our understanding of this aggressive breast cancer subtype.

Breast DCE-MRI is performed by first injecting gadolinium diethylenetriamine-pentaacid (Gd-DTPA) into the patient's bloodstream and concurrently acquiring MRI images of the breast. Since malignant lesions tend to grow leaky blood vessels in abundance, the contrast agent is taken up by tumors preferentially and subsequently leaks out of tumors rapidly. This provides the use of DCE-MRI with an advantage over the use of other modalities to detect the tumors and contributes to the high sensitivity rates reported for breast DCE-MRI.

Both benign and malignant neoplastic tissue, however, frequently have contrast enhancement patterns that differ from normal breast tissue, and these abnormalities are highlighted in the time-dependent MRIs. As such, it may be difficult for radiologists to differentiate between benign and malignant lesions simply by observing the contrast enhanced lesion on the post-contrast MRI. For this reason, clinicians have explored various methods of observing and measuring the manner in which a lesion takes up the contrast dye. It was found, for example, that data in the temporal MRIs could be plotted as single data points on a time series curve that is reflective of the lesion type. It has been shown that malignant lesions have a characteristic curve, showing rapid uptake of contrast (steep positive initial slope) and rapid washout (subsequent negative slope). Benign lesions, on the other hand, have slow contrast uptake (small positive initial slope) and then plateau or do not reach peak intensity during the time series. This description of the DCE-MRI data is now considered convention in radiologic interpretation of breast DCE-MRI.

Despite making rapid strides in the interpretation of breast DCE-MRI in the past decade, the optimal accuracy in diagnosis using breast DCE-MRI has not been achieved, and only highly experienced radiologists are able to accurately interpret breast MRIs. Furthermore, inter-observer variability for radiologic interpretation tends to be high. Numerous studies in the field of breast MRI have shown efficacy and improved diagnosis rates using CAD, but breast MRI CAD has yet to achieve the accuracy of that seen in CAD for x-ray mammography. There is a growing need in the field to provide multimodal data interpretation methods that will be able to consistently and accurately detect, diagnose and differentiate breast tumors in general and specifically benign and malignant tumors.

Described below is a comprehensive CAD system for the discrimination of (a) benign from malignant breast lesions, and (b) triple negative from non-triple negative breast lesions. The example embodiments concern a similar understanding of the typical lesion enhancement patterns to create an Expectation Maximization-driven Active Contour scheme to automatically extract the lesion contour. Quantitative features are then automatically obtained for each lesion.

Although features, such as morphology and texture are considered, the example embodiment uses a DCE-MRI feature called kinetic texture, which characterizes spatio-temporal changes in lesion texture. A classifier, for example, a support vector machine may be used to quantitatively classify the breast lesions in the dataset. Graph embedding or other nonlinear dimensionality reduction techniques may then be used to reduce data dimensionality and aid in visualization of the relationships between different breast lesion classes. The example CAD system employs three components: (1) Lesion detection and segmentation combining the time-series signal intensity data with an Expectation Maximization-driven Active Contour scheme; (2) Feature extraction using over 500 different features for the identification of the most discriminatory features of the tumor types; and (3) Breast lesion classification performed in a hierarchical manner, first distinguishing malignant from benign lesions and then, within the group of malignant lesions, identifying those of the aggressive triple-negative molecular phenotype.

An example system suitable for use with the subject invention is shown in FIG. 1. This system includes a magnetic resonance imaging system 110, a processor 112, a memory 114 and a display and keyboard unit 116. The processor 112 controls the MRI system 110 to capture multiple sets of images of a breast, each image being captured at a different time. The MRI images are DCE-MRI images so that at least one of the sets of images is taken at a time before the contrast agent has been taken-up by the tumor and at least two other sets of images are taken at times after the tumor has taken up the contrast agent.

In the example embodiment, the memory 114 has sufficient space to hold all of the sets of images used by the algorithm described below with reference to FIGS. 2 and 3. The display/keyboard may be used to control the algorithm, to process intermediate images, as described below and to display the results of the example method.

In the example method, described below, a total of 41 (24 malignant, 17 benign) breast DCE-MRI studies were used as the training and testing dataset. Immunohistochemistry was performed on the 24 malignant lesions to measure estrogen receptor, progesterone receptor, and HER2 receptor status. Of these, 13 were determined to be TN cases and 11 non-TN. Sagittal T1 weighted, spoiled gradient echo sequences with fat suppression consisting of one series pre-contrast injection of Gd-DTPA and three to five series post-contrast injection were acquired (Matrix 384×384 512×512, or 896×896, slice thickness 3 cm). Temporal resolution between post-contrast acquisitions was in the range of 45-90 seconds. For each study, all of the sets of images were stored in the memory 114 by the processor 112. The data for these studies may be entered into the memory 114 through an input/output (I/O)

port of the processor 112 (not shown) or through a wired or wireless network connection (not shown) to the processor 112.

In the example embodiment, the 41 studies are used in a testing mode to determine which image features are suitable for discriminating between malignant and non-malignant lesions and, within the identified malignant images to distinguish between TN and non-TN lesions. The sample studies and other sample studies may be used to determine ranges of parameter values that can be used to classify lesions as possibly malignant with known probabilities. The system shown in FIG. 1 may then be used according to the algorithm shown in FIGS. 2 and 3 to assist a healthcare professional in the analysis of a set of DCE-MRI images.

Figure 2:
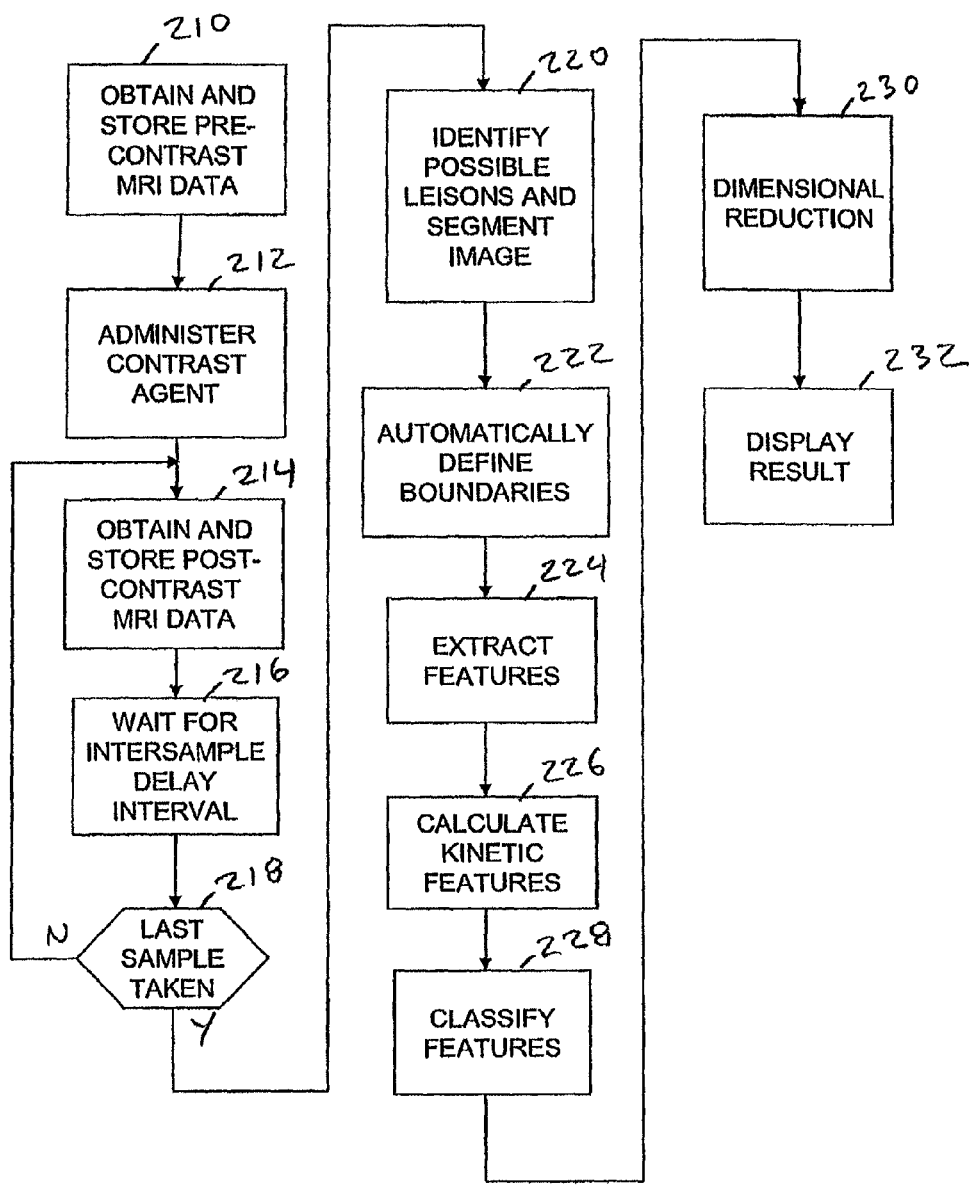
FIG. 2 is a flow-chart diagram of an example method according to an embodiment of the invention.

With reference to FIG. 2, the operation of the example embodiment in a diagnosis mode begins at step 210 when, for a particular patient, pre-contrast MRI data is obtained. Next, at step 212, the contrast agent is administered. While this step is shown as being after step 210, it is contemplated that the contrast agent may be administered before or concurrently with step 210 as long as the set of slice images in step 210 is obtained before the contrast agent is taken-up by the lesion.

Next, at step 214, the obtained data is stored in the memory 114. At step 216, the system waits for an amount of time, for example, 45 to 90 seconds. At step 218 the algorithm determines if the last set of slices has been obtained. If not, control transfers to step 214 to obtain another set of post-contrast MRI images. If, at step 218, the last set of MRI data has been obtained, control transfers to step 220.

At step 220, using the study data—or data from a particular individual when operating in the diagnosis assistance mode—for each set of images, a radiologist selects a lesion slice most representative of each lesion. This selection may be made from set of image slices taken at any time. It is contemplated, however, that the selection may be made from a time after the contrast agent has been taken-up by the lesion. In the example embodiment, the analysis described below is performed only for that slice of the lesion volume. That is to say, for the particular study, only the identified slice in the set of slices taken at each time is considered. It is contemplated, however that multiple slices may be used, with each slice being compared to corresponding slices in succeeding and/or preceding time frames.

At step 222, the selected slices are processed, according to the example method, to automatically define the contours of the lesions in the selected slice for each time period. This example process, as shown in FIG. 3 includes two steps. First, at step 310, the data is processed according to an expectation/maximization algorithm to group the voxels and second, at step 312, the grouped voxels are processed using a magnetostatic active contour model, to define the contour, or boundary, of the lesion in the image. The lesion so obtained is then visually inspected by a radiologist and if any obvious errors in segmentation are observed, these are corrected for by an attending radiologist with expertise in magnetic resonance mammography via a medical imaging software such as MRIcro, available from www.mricro.com. In the example embodiment, the medical imaging software runs on the processor and displays the result on the display of the keyboard/display unit 116. Since the technology could be applied to identifying suspicious regions in the breast that are not necessarily lesion-like, from hereon we refer to the result of segmentation as constituting a region of interest (ROI). One embodiment of the ROI is a lesion.

In step 310, the radiologist-selected slice at each time point pre- and post-contrast is compiled into a three-dimensional matrix. A signal enhancement curve is then generated for each voxel based on the signal intensity values at each time point. The coefficients of a third order polynomial are then obtained from fitting the time series curve of each individual voxel. The image scene is defined as $c=(C, f^1)$, where C is a spatial grid of voxels $c \in C$ and $f^1$ is the associated signal intensity at time $t \in \{0, 1, 2, \ldots, T-1\}$. The time-signal intensity vector $(f^0(c), f^1(c), f^2(c), \ldots, f^{T-1}(c))$ for every voxel c in the MRI image is fitted to a third order polynomial, in a least-squares sense, which is described by equation (1).

$$f^1(c) = a_3^2 t^3 + a_2^c t^2 + a_1^c t + a_0^2 \quad (1)$$

The Expectation Maximization (EM) algorithm groups the voxels based on a time-series coefficient matrix, $[a_c = (a_3^c, a_2^c, a_1^c, a_0^c), \forall c \in C]$. Based on Bayes' theorem, the EM algorithm aims to compute the posterior probability $P_{ck}$ of each voxel c belonging to $k \in \{1, 2, \ldots, K\}$, given the priori $p_{ck}$, where $p_{ck}$ is the priori probability that voxel c belongs to class k, and K is the number of Gaussian mixtures. In the example embodiment, K is 4, the dimension of the row vector $a_c$. The algorithm is run iteratively, comprising two steps: the Expectation step (E-step) and the Maximization step (M-step). The E-step calculates the posterior probability $P_{ck}$ based on the current parameters of Gaussian mixture model while the M-step recalculates or updates the model parameters, $\Sigma_k = \{\mu_k, \sigma_k, \mu^k\}$ where $\mu_k$ and $\sigma_k$ are the mean and covariance of each Gaussian component, respectively, and the $\beta_k$ values are mixture coefficients in the Gaussian mixture model. After a pre-defined number of iterations, voxel c is assigned to one of K classes, depending on which has the highest posterior probability $P_{ck}$.

Figure 3:
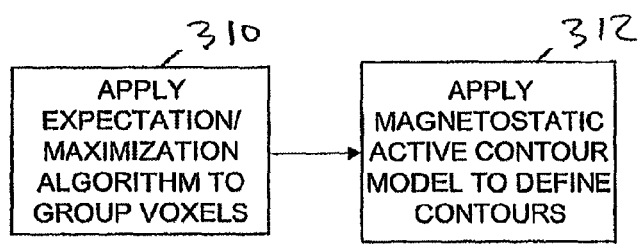
FIG. 3 is a flow-chart diagram showing details of the contour definition step of the flow-chart diagram shown in FIG. 2.

The EM results obtained in step 310 of FIG. 3 are then used to provide a specific initialization to an active contour model to obtain the final ROI segmentation. In step 312 of the example embodiment, the Magnetostatic Active Contour (MAC) model as described in an article by X. Xie and M. Mirmehdi, entitled "MAC: Magnetostatic Active Contour Model," *IEEE Transactions on Pattern Analysis and Machine Intelligence*, vol. 30, no. 4 pp. 632-646, April 2008, is employed to extract ROI boundaries. It is contemplated, however, that other active contour models may be used to define the ROI boundaries. The MAC model implements a bi-directional force field F generated from a hypothetical magnetostatic interaction between current carrying contours and object boundaries. The field F is defined over the entire image C and drives the contour towards the object boundary. The level set equation of the contour as proposed in the referenced article takes the form described in equation (2).

$$\frac{\partial \phi}{\partial n} = \alpha q(C) \nabla \cdot \left(\frac{\nabla \phi}{|\nabla \phi|}\right) |\nabla \phi| - (1-\alpha) F(C) \cdot \nabla \phi \quad (2)$$

where $\phi$ is the level set function, $$\frac{\partial \phi}{\partial n}$$

is the time derivative of $\phi$, $\alpha$ is a real constant, $q(C) = 1/(1+|\nabla C|)$ and $\nabla(\bullet)$ represents the 2D gradient. For a given image C, K class likelihood scenes $L_k = (C, I_k)$ are constructed where $I_k(c)$ assigns each voxel $c \in C$ the probability $P_{ck}$ of belonging to a class k determined from the EM result. $L_k$ is maximized to obtain a binarized scene $L_k^B = (C, l_k^B)$ where $l_k^B(c) \in \{0,1\}$ and $l_k^B(c) = 1$ if $P_{ck}(c)$ is the highest probability assigned to c. The appropriate scene $L_k^B$ representing the ROI class is manually selected and is used to initialize the active contour.

The initialization of the contour is defined as circles centered at centroids of the objects detected in $L_k^B$ via connected component labeling. The contour is then evolved until the difference between the contours of the current iteration to the next is below an empirically determined threshold.

It is desirable to have the boundaries of the ROIs well defined in order to obtain a true measure of the texture of the ROI. If, for example, the boundary of the ROI were not well defined and included voxels that were not a part of the ROI, these extra voxels would affect the texture determination. The example method described above, however, provides well-defined boundaries and tend to exclude voxels surrounding the ROI.

Referring to FIG. 2, after ROI segmentation in step 222, over 500 morphologic, textural, and kinetic features, $h_u$, $u \in \{1, 2, \ldots, 508\}$, are extracted in step 224. These features include gradient features and first and second order statistical features. These features may be obtained at several times, both before and after the contrast agent has been taken-up by the tumor by applying linear and spatial operations to the voxels inside the boundaries of the ROIs in the processed MRI slices. In the example that follows, time t=0 corresponds to the time at which the contrast agent has not been taken-up and all later times, ($t \in \{1, 2, \ldots, T-1\}$) correspond to times after the tumors have begun to take up the contrast agent.

Eleven non-steerable gradient features are obtained using Sobel, Kirsch and standard derivative operations. Gabor gradient operators comprising the steerable class of gradient features are also defined for every $c \in C$ where $c=(x, y)$, These features, $h_u(c)$ are described by equation (3).

$$h_u(c) = \frac{1}{\sqrt{2}\,\psi_X\psi_Y} e^{-\frac{1}{2}\left[\frac{x^2}{\psi_X^2}+\frac{y^2}{\psi_Y^2}\right]} \cos(2\pi\omega x), \tag{3}$$

where $\omega$ is the frequency of a sinusoidal plane wave along the X-axis, and $\psi_x$ and $\psi_y$ are the space constraints of the Gaussian envelope along the X and Y directions respectively. Filter orientation, $\theta$, is affected by the coordinate transformations: $x'=z(x \cos \theta + y \sin \theta)$ and $y'=z(-x \sin \theta + y \cos \theta)$, where z is the scaling factor. Gabor gradient features were calculated at 6 scales $$\left(z \in \left\{\frac{\pi}{2\sqrt{2}}, \frac{\pi}{4}, \frac{\pi}{4\sqrt{2}}, \ldots \frac{\pi}{16}\right\}\right),$$

orientations $$\left(\theta \in \left\{0, \frac{\pi}{8}, \frac{\pi}{4}, \frac{3\pi}{8}, \frac{\pi}{2}, \frac{5\pi}{8}, \frac{3\pi}{4}, \frac{7\pi}{8}\right\}\right)$$

and 4 window sizes ($s \in \{3, 5, 8, 15\}$).

Four first order statistical features (mean, median, standard deviation, and range) for 3 different window sizes are calculated for the gray values of pixels within the sliding window neighborhood $\mathcal{N}_s$, $s \in \{3, 5, 8\}$.

Thirteen Haralick features are also included in the extracted features. To calculate the second order statistical (Haralick) feature scenes, a G×G co-occurrence matrix $O_{d,c,s}$ is computed, associated with $\mathcal{N}_s(c_i)$, where G is the maximum grayscale intensity in C. The value at any location $[e_1, e_2]$ in $O_{d,c,s}$, where $e_1, e_2 \in \{1, 2, \ldots, M\}$, represents the frequency with which two distinct voxels $c_i$, $c_j \in \mathcal{N}_s(c)$ where $i, j \in \{1, 2, \ldots, |C|\}$ with associated image intensities $f(c_i)=g_1$, $f(c_j)=g_2$ are separated by distance d. A total of 13 Haralick features including contrast energy, contrast inverse moment, contrast average, contrast variance, contrast entropy, intensity average, intensity variance, intensity entropy, entropy, energy, correlation, and 2 information measures are extracted at every voxel $c \in C$, based on $O_{d,c,s}$, for $s \in \{3, 5, 7\}$, $d=1$ and $G \in \{64, 128, 256\}$.

The feature set includes the extracted features described above as well as kinetic features calculated from the extracted features. The kinetic features are generated from the extracted features in step 226. Each of the kinetic features models the behavior of a voxel across all of the sample times in the set of corresponding slices. Although calculation of kinetic features is described above with respect to a ROI, it is understood that kinetic features may also be calculated for one or more non-ROI areas, by using extracted features representing the non-ROI areas. For example, kinetic features of non-ROI areas may be used to characterize and/or quantify breast parenchyma.

Kinetic signal intensity features are computed in step 226, as the coefficients $[a_3, a_2, a_1, a_0]$ of a third order polynomial obtained from fitting a curve in a least-squares sense to the signal intensity contrast enhancement curves. Hence, for each c in $C_0, C_1, C_2, \ldots, C_{T-1}$, a third order curve is fitted using equation (4):

$$f(t)=a_3t^3+a_2t^2+a_1t+a_0 \tag{4}$$

Where $t \in \{0, 1, 2, \ldots, T-1\}$ and $c \in C$. Note that $f^t(c)$ represents the signal intensity at each spatial location, $c \in C$, across the pre- and post-contrast MRI scenes.

To calculate the kinetic textural features, a first order statistical descriptor which could be at least one of the textural feature's mean, mode, median, variance, or standard deviation value, $\rho_u$, is plotted over time such that a kinetic texture curve is created, which is analogous to the one created for signal intensity. A third order polynomial is fitted to this curve to characterize its shape, defining four associated coefficients as shown in equation (5):

$$\rho_u(t)=r_{u,3}t^3+r_{u,2}t^2+r_{u,1}t+r_{u,0}. \tag{5}$$

$[r_{u,3}, r_{u,2}, r_{u,1}, r_{u,0}]$ is the feature vector, describing the kinetic texture feature, for each texture feature, u, as a function of time. The Pre-contrast Textural Features are defined as the mean texture values for each feature described above before contrast injection (t=0).

A summary of the extracted features is shown in Table 1.

TABLE 1

Extracted Features

| Feature Type | Feature | Additional Details | Window Size | Total # features |
|---|---|---|---|---|
| Morphological | Area overlap ratio<br>Average distance ratio<br>Standard deviation | | N/A | 7 |

TABLE 1-continued

Extracted Features

| Feature Type | Feature | Additional Details | Window Size | Total # features |
|---|---|---|---|---|
| | from avg dist. Ratio | | | |
| | Variance of dist. Ratio | | | |
| | Perimeter ratio | | | |
| | Compactness | | | |
| | Smoothness | | | |
| Texture | Gabor Filters | 6 scales, 8 orientations | 3, 5, 8, 15 | 48 × 4 = 192 |
| | Kirsch Filters | x-dir, y-dir, xy-diag | 3 | 3 × 3 = 9 |
| | Sobel Filters | x-dir, y-dir, xy-diag, yx-diag | 3 | 4 × 3 = 12 |
| | Grey Level | Mean | 3, 5, 8 | 8 × 3 = 24 |
| | | Median | | |
| | | Std | | |
| | | Range | | |
| | | gradient x | | |
| | | gradient y | | |
| | | magnitude of gradient | | |
| | | diagonal gradient | | |
| | Haralick | Contrast energy | 3, d = 1 | 13 |
| | | Contrast inverse moment | | |
| | | Contrast average | | |
| | | Contrast variance | | |
| | | Contrast entropy | | |
| | | Intensity average | | |
| | | Intensity variance | | |
| | | Intensity entropy | | |
| | | Entropy | | |
| | | Energy | | |
| | | Correlation | | |
| | | Information measure 1 | | |
| | | Information measure 2 | | |
| Kinetic Texture | Gabor Filters | Same as above texture | 192 + 9 + 12 + 24 + 13 = 250 | |
| | Kirsch Filters | | | |
| | Sobel Filters | | | |
| | Grey Level | | | |
| | Haralick | | | |

The features listed above are used in the testing mode of the system in which the 41 known cases are used to train and test the example system. As described below, the morphological features may not be needed when the system is operated in diagnostic assistance mode. Indeed, it is contemplated that a suitable classifier can be constructed using only the kinetic texture features.

After the kinetic features have been calculated in step 226, the next step in the process is to classify the features at step 228. In the example system, support vector machine (SVM) methods are applied to evaluate the ability of each feature class (morphology, texture, kinetic texture and kinetic signal intensity) to classify each ROI as benign or malignant. It is contemplated, however, that other classification methods may be used, such as neural networks, Hidden Markov Models and Frequent Itemset Mining. An example Support Vector Machine algorithm is described in a publication by C. Cortes and V. Vapnik entitled "Support Vector Networks," *Machine Learning*, vol 20 no. 2 Springer Netherlands 273-297 (1995). An example Hidden Markov Model system is described in a publication by S. Wong, A. B. Gardner, A. M. Krieger, B. Litt, "A Stochastic Framework for Evaluating Seizure Prediction Algorithms Using Hidden Markov Models," *J. Neurophysiology* 97(3): 2525-2532 (2007). An example Frequent Itemset Mining system is described in a publication by A. B. Gardner, A. M. Krieger, G. Vachtsevanos, B. Litt, entitled "One Class Novelty Detection for Seizure Analysis from Intracranial EEG," *J. Machine Learning Research* 7 1025-1044, (2006). Although a binary classifier is described, it is understood that the classifier may include a multi-class classifier. Accordingly, the kinetic features may be classified into at least two classes.

The example classifier contains two stages: (a) training and (b) testing. The features corresponding to each of the feature classes are used as inputs to the classifier individually and in combination. From the training data, a hyper-plane is created in the eigen-space that optimally separates the data into benign and malignant ROI classes.

Given a set of labeled training data from two distinct classes, the example SVM classifier project the data into a high dimensional space constructed by a kernel function, $\Psi$, operating on the training data. Testing data are then classified according to where they fall in relation to the hyper-plane when operated on by the same kernel function $\Psi$. The objects of each class that lie closest to this hyper-plane are the "support vectors." The general form of the SVM classifier is given by equation (6):

$$V(x) = \sum_{\tau=1}^{N_S} \xi_\tau y_\tau \Psi(x, x_\tau) + b, \quad (6)$$

where x is the input training data, $x_T$, $T \in \{1, 2, \ldots, N_s\}$ denotes the support vectors, $\gamma \in \{-1, 1\}$ as the training labels, $\Psi(\bullet, \bullet)$ is a positive, definite, symmetric kernel function, b is a bias obtained from the training set to maximize the distance between the support vectors, and $\xi$ is a model parameter chosen to maximize the objective function shown in equation (7):

$$\Delta(\xi) = \sum_{\tau=1}^{N_s} \xi_\tau - \frac{1}{2} \sum_{\tau,\rho=1}^{N_s} \xi_\tau \xi_\rho y_\tau y_\rho \Psi. \quad (7)$$

The kernel function, $\Psi(\bullet, \bullet)$, defines the nature of the decision hyper-plane. The example SVM uses a common kernel called the radial basis function (RBF). The parameters ρ and b are found through empirical training and testing of the classifier.

After classifying the data in step 228 using the example SVM classifier, it may be desirable to reduce the dimensionality of the data in step 230 using a nonlinear dimensionality reduction technique such as graph embedding (GE) or locally linear embedding (LLE). GE is described in an article by S. Yan et al. entitled "Graph Embedding: A General Framework for Dimensionality Reduction," Proc. 2005 Internal Conference on Computer Vision and Pattern Recognition. LLE is described in a publication by L. K. Saul et al. entitled "An Introduction to Locally Linear Embedding" which is available at http://www.cs.toronto.edu/~roweis/lle/papers/lleintro.pdf.

After dimensional reduction in step 230, the last step in the process is to display the result in step 232 using the display device of the display/keyboard 116, shown in FIG. 1. The output data may be displayed as a simple result, indicating, for example, a probability that a particular ROI is malignant and/or a triple negative lesion. Alternatively, the result may be displayed in reduced dimensions as a point relative to a reduced-dimension version of the hyper-plane that defines the boundary between malignant and non-malignant or TN and non-TN lesions. This second display may be advantageous as it may provide a readily discernable distance between the data point corresponding to the ROI and the reduced-dimension hyper-plane.

The efficacy of the feature set is then evaluated based on the ability of the feature set to correctly classify each ROI, using the remaining ROIs in the dataset as the training set. Accuracy is defined as (tp+tn)/(tp+tn+fp+fn), where tp is the number of true positives, to is the number of true negatives, fp is the number of false positives, and fn is the number of false negatives.

In the example embodiment, after the system has been run to identify malignant ROIs, the data for the malignant ROIs is separated from the non-malignant ROIs and the classifier algorithm is run again on that data to separate TN lesions from non-TN malignant lesions.

Table 2 shows the ability of the example system to distinguish benign ROIs from malignant ROIs and Table 3 shows the ability of the example system to distinguish TN lesions from non-TN lesions. These tables quantify the accuracy (Acc.), sensitivity (Sens.) and specificity (Spec.) of the example method using respectively different feature sets to distinguish benign and malignant ROIs, in Table 2, and TN and non-TN lesions, in Table 3.

TABLE 2

SVM evaluation for Benign vs. Malignant ROIs

| Feature set | Acc. (%) | Sens. (%) | Spec (%) |
|---|---|---|---|
| Morphological | 73 | 88 | 53 |
| Pre-contrast Texture | 63 | 90 | 25 |
| Kinetic Signal Intensity | 63 | 67 | 59 |
| Kinetic $1^{st}$ order Textural | 83 | 79 | 88 |
| Kinetic $2^{nd}$ order Statistical | 73 | 88 | 53 |

TABLE 3

SVM evaluation for TN vs. non-TN lesions

| Feature set | Acc. (%) | Sens. (%) | Spec (%) |
|---|---|---|---|
| Morphological | 58 | 56 | 9 |
| Pre-contrast Texture | 71 | 92 | 45 |
| Kinetic Signal Intensity | 58 | 77 | 36 |
| Kinetic $1^{st}$ order Textural | 83 | 77 | 91 |
| Kinetic $2^{nd}$ order Statistical | 92 | 92 | 91 |

From these results, it is apparent that there is an advantage to using the kinetic first order textural features and kinetic second order statistical features to detect malignant ROIs and, in particular, TN lesions.

Embodiments of the subject invention described above generally concern the detection of breast tumors. As discussed above, the subject invention is not limited to the detection of breast tumors. Rather, the invention may be applied to detect and classify non-malignant ROIs in a body. Described below is another embodiment of the subject invention directed to the detection and classification of vulnerable and stable carotid atherosclerotic plaques.

MRI and its derivatives may provide a solution that is significantly less invasive than IV-US, while allowing for visualization of plaques, such that vulnerable and stable plaques may be differentiated. DCE-MRI may be performed by injecting a gadolinium-based contrast agent into the patient's bloodstream and concurrently acquiring MRI images of the ROI. The use of a contrast agent may increase the differentiability of the two plaques, as the contrast uptake kinetics varies between the two plaques (due to the differences in plaque composition). Vulnerable plaques not only take up a larger quantity of the gadolinium-based contrast agent, but may also uptake much more rapidly than stable plaques. The difference in pharmacokinetic behavior is largely due to the contrast agent's high affiliation with inflammation and neovascularization, both of which are present in much higher rates in vulnerable plaques.

Due to the clinical nature of plaques, and their dependency on quantifiable changes in intensity values over time, a computer-aided diagnosis (CAD) system that could detect the plaque type would assist clinicians in therapeutic decision-making, monitoring therapy response, and increase our understanding of vulnerable and stable carotid atherosclerotic plaques.

Described below is a method for discriminating between vulnerable and stable carotid atherosclerotic plaques. A suitable comprehensive CAD system for discriminating plaque type is the example system shown in FIG. 1, the description of which is provided above.

Aspects of the invention include extracting a suite of texture features, for each image slice. The texture features may allow for manipulation of the data to emphasize statistical and structural information in the image. Kinetic signal intensity features may be calculated from the extracted textural features, to emphasize pharmacokinetic differences in the plaques. According to an example embodiment, the kinetic intensity features may be calculated via fitting of a cubic polynomial to a DCE-MRI volume on a per-voxel basis, to allow for trends in contrast agent changes to be readily visualized and quantified as the coefficients of the polynomial. Thus, methods of the subject invention may be able to account for statistical, structural, and pharmacokinetic dependencies that may vary within the data. Finally, feature selection and classification may be performed from the resulting extracted features and kinetic signal intensity features.

To illustrate the discrimination of plaque type according to aspects of the invention, reference is made to experiments performed with a rabbit dataset using a Gd-DTPA contrast agent in DCE-MRI volumes. In the experiment, DCE-MRI Image volumes for 10 rabbits with carotid atherosclerotic plaques were obtained. Each volume has between 6 and 8 associated time points and a size of 512×512×30 voxels. A representative slice for each rabbit was chosen at each time point. For each patient, segmentations for the lumen on the images were provided along with a ground truth of vulnerable or stable plaque. Of the 10 rabbits, 8 had stable atherosclerotic plaques and 2 had vulnerable atherosclerotic plaques. Classification for the dataset was performed not on a per patient basis but as a voxel-wise technique. In this manner, a total of 2,350 lumen voxels were obtained from all of the patients and used for the classification of vulnerable or stable plaques.

Figure 4:
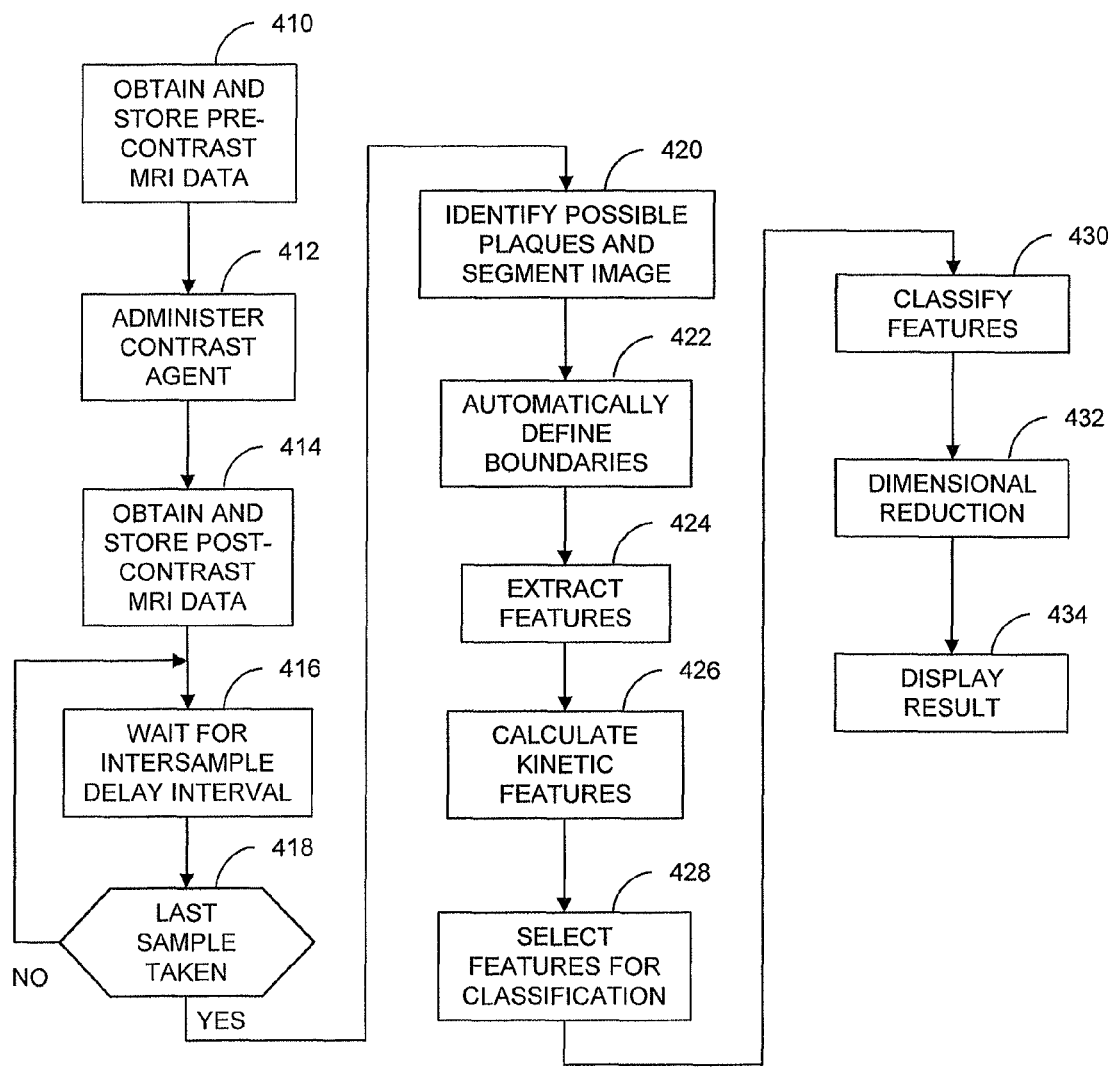
FIG. 4 is a flow-chart diagram of an example method according to another embodiment of the invention.

With reference to FIG. 4, a flow-chart diagram of an example method is shown for discrimination of atherosclerotic plaque type, according to an embodiment of the invention. The method described in FIG. 4 is similar to the method described above with respect to FIG. 2, except that FIG. 4 describes the discrimination of carotid atherosclerotic plaque type (as opposed to the breast lesion discrimination described in FIG. 2). Steps 410-418 are similar to steps 210-218, except that steps 410-418 are applied to a set of DCE-MRI image slices relating to carotid atherosclerotic plaque of a patient (i.e., DCE-MRI image slices that include a lumen of an artery which may indicate a plaque).

Figure 5A:
FIGS. 5A, 5B 5C and 5E are example images illustrating steps of the method shown in FIG. 4.

At step 420, using study data—or data from a particular individual when operating in the diagnosis assistance mode—for each set of images, a radiologist selects an image slice most representative of the lumen (having a possible plaque). For example, FIG. 5A is an example image slice, from among the rabbit dataset, illustrating a selected image slice including the lumen. As discussed above, with respect to step 220 in FIG. 2, this selection may be made from a set of image slices taken at any time or may be made from a time after the contrast agent has been taken-up by the lesion. In the example embodiment, the analysis described below is performed only for that selected slice of the lumen volume. It is contemplated, however that multiple slices may be used, with each slice being compared to corresponding slices in succeeding and/or preceding time frames.

Figure 5B:
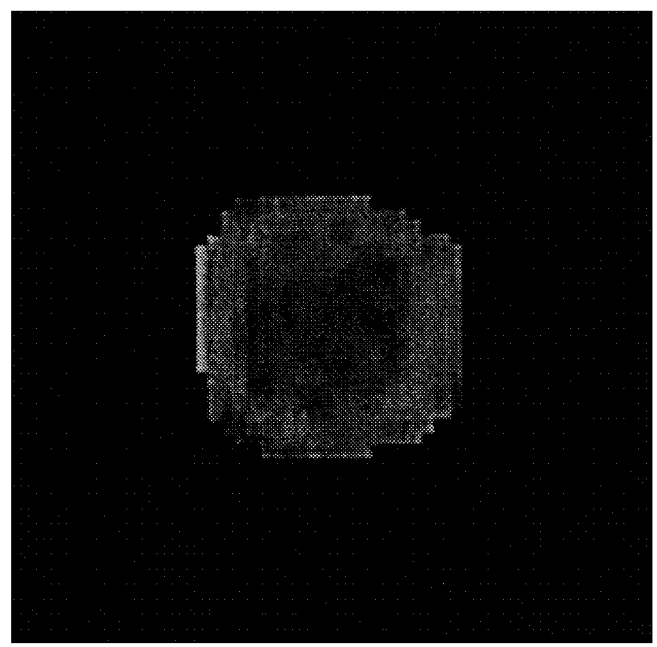

Referring back to FIG. 4, at step 422, the selected slices are processed, according to the example method, to automatically define the contours of the lumen in the selected slice for each time period. For example, FIG. 5B is an example image illustrating an extracted lumen from the image slice shown in FIG. 5A. The lumen may be extracted based on segmentation similar to the method described above with respect to step 222 (FIG. 2) and FIG. 3.

Figure 5C:
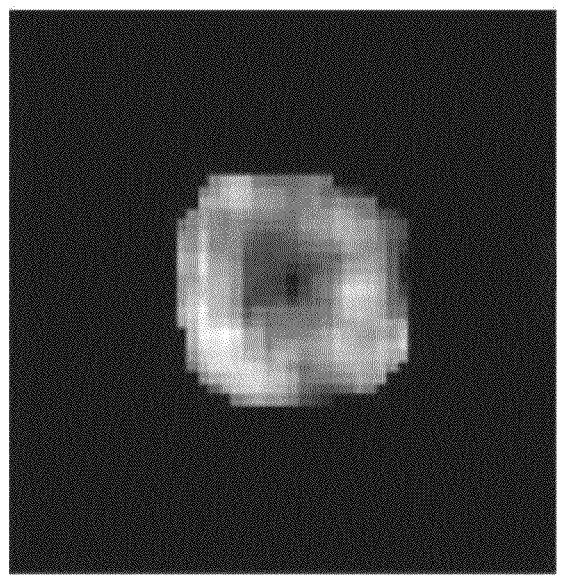

Referring to FIG. 4, after the segmentation in step 422, over 500 morphologic, textural, and kinetic features are extracted in step 424 (similar to step 224 in FIG. 2). These features include gradient features and first and second order statistical features. For example, FIG. 5C is an example image illustrating an extracted texture feature of the lumen shown in FIG. 5B.

With respect to the rabbit dataset, a total of 45 gray level (first order statistics), 192 Gabor (Gaussian kernel) and 234 Haralick (second order statistics) features are calculated on the data set. Accordingly, a total of 471 texture images may be produced for every time point for every rabbit. The gray level features may be extracted based on first order statistics, varied window sizes and gray level intensity scaling. The Gabor features may be extracted based on varied window sizes, wavelet length, filter orientation, and gray level intensity scaling. The Haralick features may be extracted based on second order statistics, varied window sizes and gray level intensity scaling. In general, a wide variance of parameters including window size, image intensity and texture features specific parameters may be modulated in order to capture a large amount of information about the underlying images.

Figure 5D:
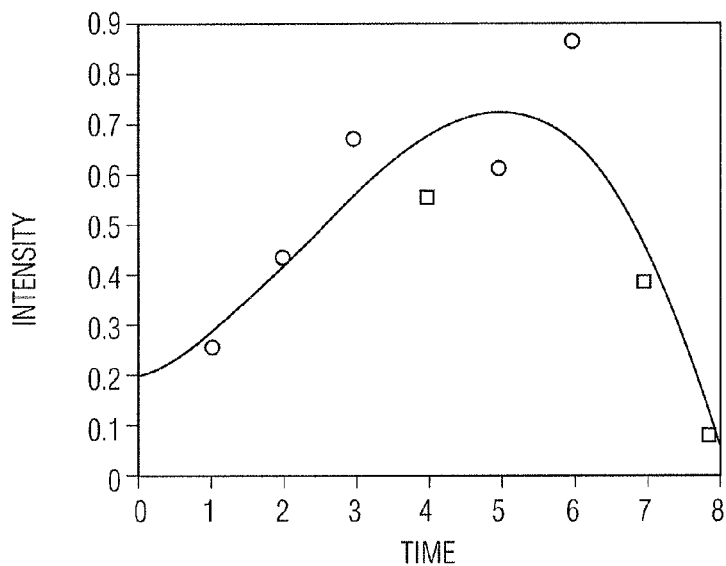
FIG. 5D is a graph of example kinetic textural features and an example cubic spline polynomial function with respect to time, illustrating a step of the method shown in FIG. 4.

Referring back to FIG. 4, the feature set (step 424) includes the extracted features described above as well as kinetic features calculated from the extracted features. The kinetic features are generated from the extracted features in step 426. Kinetic signal intensity features are computed in step 426 (similar to step 226 in FIG. 2), as the coefficients $[a_3, a_2, a_1, a_0]$ of a third order polynomial obtained from fitting a curve in a least-squares sense to the signal intensity contrast enhancement curves. For example, FIG. 5D is an example graph including feature values 502 and polynomial-fitted curve 504 illustrating calculation of kinetic textural features for the lumen shown in FIG. 5B.

In an exemplary embodiment, textural kinetic feature calculation may be performed to simultaneously account for DCE-MRI volumes having different numbers of time points and to model a change in DCE concentration.

For example, for a given rabbit and feature, a total of t time points exist, each of which has a feature image associated with it. A particular pixel on the feature image F(x,y), would have a particular value at row x, column y and time point t. Thus a set of feature values $\{F(x,y)_1, \ldots, F(x,y)_t\}$ (for example, feature values 502 in FIG. 5D) could be used to describe the change in feature at the particular voxel over time. A cubic polynomial (for example, curve 504 in FIG. 5D) is fit to the set of feature values, $p(t)=a_0t^3+a_1t^2+a_2t+a_3$. The original set of features $\{F(x,y)_1, \ldots, F(x,y)_t\}$ is then replaced with the coefficient set $\{a_0, a_1, a_2, a_3\}_{x,y}$ at the voxel location. Thus a total of t features is reduced to textural kinetic coefficients which successfully capture the changes in intensity over time.

In an exemplary embodiment, textural kinetic modeling is performed for every rabbit, at every feature image and at every voxel. A total of 2,350 voxels from the combined 10 rabbit lumens produce a total of 1,884 textural kinetic coefficients from the original 471 features at the various time points. Note that 471×4=1884, which is consistent with textural kinetics combination of feature time points to produce four cubic polynomial coefficients which capture the change in feature value.

Figure 5F:
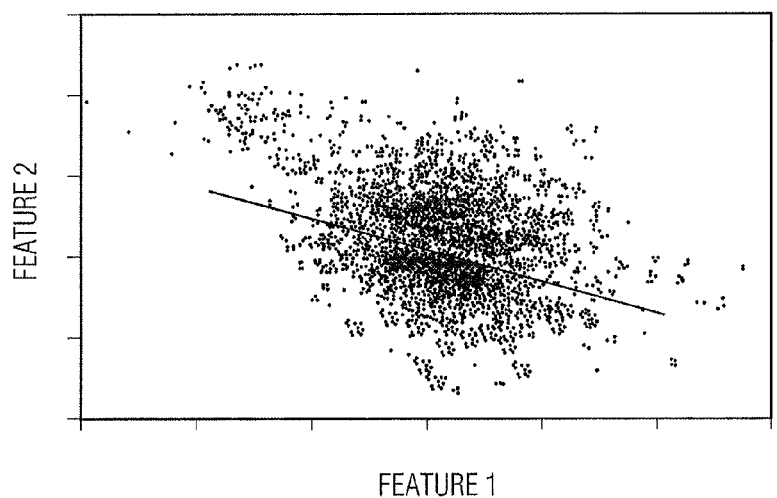
FIG. 5F is a scatterplot diagram of an example feature classification result, illustrating a step of the method shown in FIG. 4.
Figure 5E:
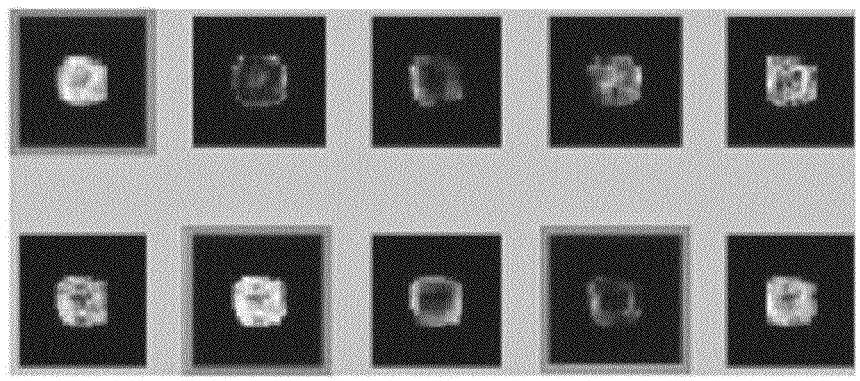

After the kinetic features have been calculated in step 426, the next step in the process is to select features for classification in step 428. As part of the feature selection process, the coefficients of the cubic polynomials (determined in step 426) may be examined for mutual dependence, with any dependent features being removed (i.e., pruned) from the dataset. Feature selection may then be performed, for example, by a forward feature selection algorithm via naïve Bayesian classification. For example, FIG. 5E are example graphs illustrating unbiased feature selection for the lumen shown in FIG. 5B.

One criterion for Bayesian classification to function in the scope of feature selection is that the paired features should produce a covariance matrix that is invertible. Because the forward feature selection is a quasi-brute force algorithm (which will ultimately result in the pairing of many of the features), it is desirable that none of these paired features produces a covariance matrix that will not be invertible.

The feature set may be pruned by adding features one by one and testing the covariance matrix for an inverse. Any features added that do not produce an invertible covariance matrix may be removed from the feature pool, so that they are not passed forward for feature selection. The removal of dependencies in the feature pool not only guarantees functionality of the feature selection routine, but may also increase the computational speed in the feature selection algorithm. For example, with respect to the rabbit dataset, of the 1884 texture features described above, a total of 412 features (21.87%) remain after pruning (based on testing the features for an invertible covariance matrix).

In an exemplary embodiment, a forward feature selection algorithm may be implemented (after removal of any dependencies). With respect to the rabbit dataset, for a given rabbit, the features that are passed on for classification may be selected based on the efficacy of a selected feature set on all other rabbits (e.g., the other 9 rabbits) in the dataset in a forward feature selection routine. Forward feature selection may be performed by sampling all of the features independently and searching for a single feature that provides the highest area under curve (AUC). Features may be added one by one based on which features most increase the AUC, until either no features remain, or until the AUC cannot be increased. For the rabbit dataset, the voxels from the 9 rabbits used for feature selection are pooled and then split into 5 folds on which cross-validation is performed.

Example classifiers include, without being limited to, naïve linear discriminant analysis (LDA), and naïve quadratic discriminant analysis (QDA). Because the feature pool may be large, it may be difficult to find features that produce a non-sparse covariance matrix in a Bayesian framework. For this reason the naïve assumptions may be made, allowing for diagonalization of the covariance matrix.

Because the textural kinetic algorithm (step 426) combines various time point features to produce a set of coefficients (for example, four coefficients), it may be concluded that a feature selection algorithm should allow these features to remain together. However, different coefficients may explain different behaviors in the cubic polynomial. Accordingly, it may be desirable to allow the textural kinetic coefficients to be selected separately from one another. For the above reasons, feature selection may be performed in two ways: 1) allowing individual features to be selected and 2) forcing groups of textural kinetics coefficients to remain together. By testing both feature selection classifiers (naïve LDA vs. naïve QDA) and feature pairing (textural kinetic coefficients together or apart) a total of four different feature selection routines may be evaluated.

With respect to the rabbit dataset, feature selection was evaluated by comparing which features (Gabor, gray level or Haralick) are most commonly selected. Table 4 provides the number of features selected for each of the four routines and the percentage breakdown of the three main feature groups. Table 4 shows that feature selection is dominated with Haralick features, where the majority of features in every selection routine are Haralick. Gabor features are included in a small amount in only half of the selection routine and only when textural kinetic features are forced to be paired. Gray level features appear in one of the cases, with 11.76% of the features selected being gray level.

TABLE 4-continued

| Feature Selection | | | | |
|---|---|---|---|---|
| Feature Selection | Naïve LDA | | Naïve QDA | |
| Coefficients | Paired | Unpaired | Paired | Unpaired |
| % Gabor | 18.75 | 0 | 40 | 0 |
| % Haralick | 81.25 | 100 | 60 | 82.24 |

As shown in Table 4, the unpaired textural kinetic coefficients outperform the paired textural kinetic coefficients. The forward feature selection algorithm is greedy and looks to optimize the AUC by adding features. By forcing the forward feature selection algorithm to accept certain features on a paired basis rather than individually, the paired classifier may choose a sub-optimal set of features.

Referring to FIG. 4, after the features have been selected in step 428, the next step in the process is to classify the features at step 430. Step 430 is similar to step 228 (FIG. 2), described above, except that step 430 classifies the selected features as being a stable plaque or a vulnerable plaque. For example, FIG. 5F is an example scatterplot diagram illustrating classification results for the lumen shown in FIG. 5B.

Similar to step 228 (FIG. 2), the classifier may classify the selected features as belonging to a first class or a second class. For example, the first class may represent a stable plaque and the second plaque may represent a vulnerable plaque. As another example, the first class may be represent an acute vulnerable plaque and the second class may represent an intermediate vulnerable plaque.

In an exemplary embodiment, a statistical classifier, such as a C4.5 bagged classifier, is used. An example C4.5 bagged classifier is described in a publication by J. R. Quinlan entitled "Bagging, Boosting, and C4.5," *Proceedings of the Thirteenth National Conference on Artificial Intelligence*, pp. 725-730 (1996). A C.4.5 bagged classifier may be chosen due to both the transparency of the decision tree algorithm and the increased accuracy that the bootstrap aggregation (bagging) routine may provide. In the context of biological data, it is favorable to be able to understand why some features outperform others. A decision tree framework makes this clear as the simple threshold approach may allow for an understanding of which biological factors play a role in pathology determination.

Classification results for the rabbit data set are shown in Table 5 below. Quantitative evaluation of the classification results show that the naïve LDA classifier outperformed the naïve QDA classifier, and also that unpaired features outperformed paired features. An area under the curve (AUC) of 0.9027 was observed for the unpaired naïve LDA routine as the maximal value along with the also maximal 87.87% classification accuracy. Sensitivity and specificity are calculated for all features by finding the point of the receiver operating characteristic (ROC) curve closest to sensitivity=specificity=1.

TABLE 4

| Feature Selection | | | | |
|---|---|---|---|---|
| Feature Selection | Naïve LDA | | Naïve QDA | |
| Coefficients | Paired | Unpaired | Paired | Unpaired |
| Avg. # of Features selected | 1.6 | 1.7 | 4 | 6.8 |
| % Gray Level | 0 | 0 | 0 | 11.76 |

TABLE 5

| Classification Results | | | | |
|---|---|---|---|---|
| Feature Selection | Naïve LDA | | Naïve QDA | |
| Coefficients | Paired | Unpaired | Paired | Unpaired |
| AUC | 0.8244 | 0.9027 | 0.6760 | 0.8102 |
| Accuracy | 0.7826 | 0.8787 | 0.7404 | 0.8430 |

TABLE 5-continued

| | Classification Results | | | |
|---|---|---|---|---|
| Feature Selection | Naïve LDA | | Naïve QDA | |
| Coefficients | Paired | Unpaired | Paired | Unpaired |
| Specificity | 0.8514 | 0.9490 | 0.9660 | 0.9418 |
| Sensitivity | 0.6545 | 0.7482 | 0.3212 | 0.6594 |

Figure 6A:
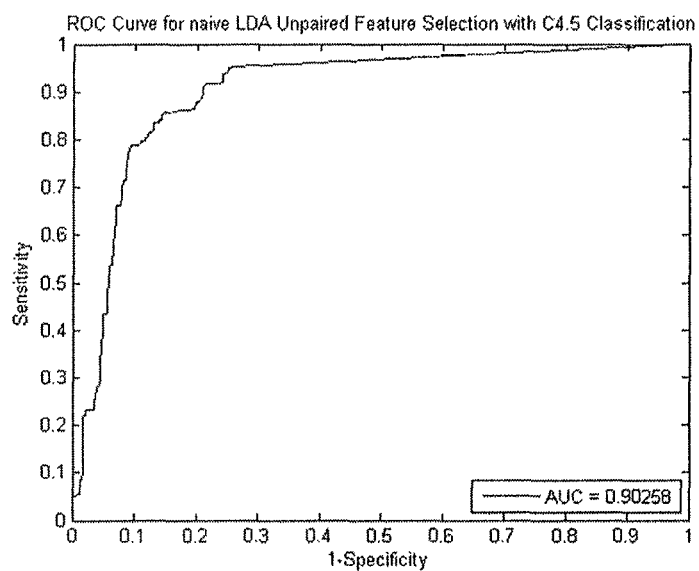
FIGS. 6A and 6B are example receiver operating characteristic (ROC) curves as a function of sensitivity and specificity for unpaired and paired feature selection, respectively, according to an embodiment of the invention.
Figure 6B:
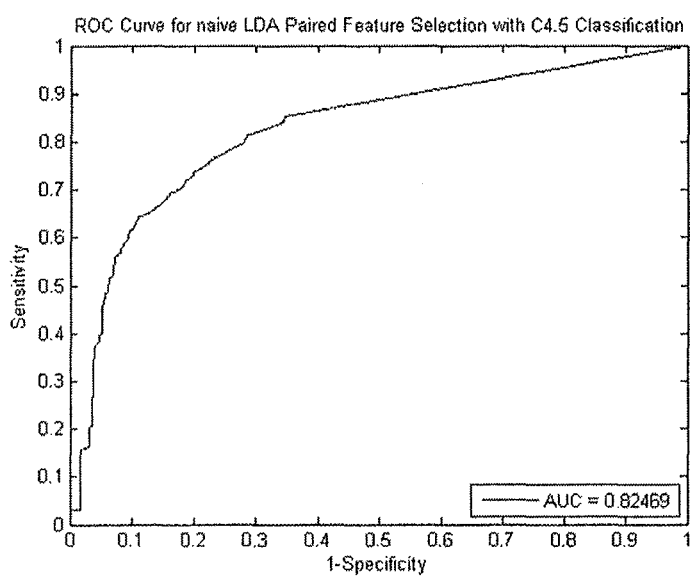

Qualitative evaluation was performed by observations made on both the ROC curves and probability maps plotted back onto the lumens. FIGS. 6A and 6B are example ROC curves for naïve LDA unpaired and naïve LDA paired feature selection, respectively. It may be appreciated that there is little tradeoff between sensitivity and specificity for the unpaired selection, whereas a much greater tradeoff is visible for the paired selection.

Referring to FIGS. 7A-7C, images are shown illustrating example plaque classification results for the rabbit dataset. In particular, FIG. 7A illustrate example plaque classification results focusing on the vessel wall; FIG. 7B illustrates example vulnerable plaques (scaled for consistency across cases); and FIG. 7C illustrate example stable plaques (scaled for consistency across cases).

Referring back to FIG. 4, After classifying the data in step 430 using the example C4.5 bagged classifier, it may be desirable to reduce the dimensionality of the data in step 432. After dimensional reduction in step 432, the last step in the process is to display the result in step 434 using the display device of the display/keyboard 116, shown in FIG. 1. Steps 432 and 434 are similar to steps 230 and 232, described above with respect to FIG. 2.

The inventors have determined that plaque classification results may be improved, for example, by segmenting the image slice to include only plaque, by including a larger sample of data (to minimize the influence of outlier features) and/or by providing automatic segmentation of the plaque in the lumen (to increase automation of the process and to minimize working only with the lumen, because a number of the classified voxels may not be a plaque).

Although not shown in FIG. 4, after the features are classified (step 430), images may be aligned to a template, based on the information gained from multiple image attributes (textural and functional), for automated alignment of multi-modal and multi-parametric imagery.

In general, images collected according to multiple modalities (e.g., computed tomography (CT), magnetic resonance (MR), ultrasound (US)) as well as multiple sequences within MR (e.g., T1 weighted, T2 weighted, steady state free precession (SSFP), pre-contrast enhancement, post-contrast enhancement and DCE) may be aligned prior to processing using automatic non-rigid registration of multimodal imagery, including structural and functional data that utilizes multiple textural feature images to drive an automated spline based non-linear image registration process. Multimodal image registration is generally more complicated than registration of images from a same modality or protocol on account of the difficulty in quantifying similarities between different structural and functional information, and also due to possible physical deformations resulting from the data acquisition process.

According to an exemplary embodiment, extraction and selection of informative features for registration may be determined by Collection of Non-linear attributes for registration using splines (COLLINARUS). An example COLLINARUS method is described in a publication to Chappelow et al. entitled "COLLINARUS: Collection of Image-derived Non-linear Attributes for Registration Using Splines," *Proc. of SPIE*, Vol. 7259 (2009), incorporated herein by reference.

It may also be appreciated that plaque classification results may be improved, for example, by segmenting the image slice to include only the plaque, by including a larger sample of data (to minimize the influence of outlier features) and/or by providing automatic segmentation of the plaque in the lumen (to increase automation of the process and to minimize working only with the lumen as a number of the voxels classified may not be associated with the plaque).

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for classifying multiple voxels within dynamic contrast-enhanced (DCE) magnetic resonance imaging (MRI) images acquired over a series of time periods, the method comprising:

receiving a 2D or 3D image for each time period from among the corresponding set of DCE MRI images, the image representing a plurality of voxels having a respective plurality of voxel locations, the plurality of voxels including multiple voxels in a region of interest (ROI) being representative of the ROI in the corresponding time period;

determining 2D or 3D textural features for at least the multiple voxels in the ROI in each image at each time period in the series of time periods;

determining kinetic texture features for each of the voxel locations in the ROI across all time periods in the series of time periods to represent spatio-temporal changes in the textural features of each of the voxels in the ROI over the series of time periods;

fitting a mathematical model to the determined kinetic texture features representing the changes in the textural features of each of the voxel locations in the ROI;

determining parameter values of the mathematical model that is fitted to the changes in texture for each of the voxel locations in the ROI by selecting individual unpaired coefficients from the mathematical model as the determined parameters;

applying a classifier to the determined kinetic texture features and to the determined parameters of the mathematical model of changes in spatio-temporal texture to identify an abnormality in the ROI and to classify the abnormality into one of at least two classes; and visually indicating the classified abnormality as determined by the classifier for at least a portion of ROI in the image.

2. A non-transitory computer readable medium including computer program instructions configured to cause a computer processor to perform the steps of a method for classifying multiple voxels within dynamic contrast enhanced (DCE) magnetic resonance imaging (MRI) images acquired over a series of time periods, the method comprising:

receiving a 2D or 3D image for each time period from among the corresponding set of DCE MRI images, the image representing a plurality of voxels having a respective plurality of voxel locations, the plurality of voxels including multiple voxels in a region of interest (ROI) being representative of the ROI in the corresponding time period;

determining 2D or 3D textural features for at least the multiple voxels in the ROI in each image at each time period in the series of time periods;

determining kinetic texture features for each of the voxel locations in the ROI across all time periods in the series of time periods to represent spatio-temporal changes in the textural features of each of the voxel locations in the ROI over the series of time periods;

fitting a mathematical model to the determined kinetic texture features representing the changes in the textural features of each of the voxel locations in the ROI;

determining parameter values of the mathematical model that is fitted to the changes in texture for each of the voxel locations in the ROI by selecting individual unpaired coefficients from the mathematical model as the determined parameters;

applying a classifier to the determined kinetic texture features and to the determined parameters of the mathematical model of changes in spatio-temporal texture to identify an abnormality in the images and to classify the abnormality into one of at least two classes; and visually indicating the classified abnormalities as determined by the classifier for at least a portion of voxel locations in the ROI.

3. A method for classifying voxel locations in a region of interest (ROI) of a body from sets of dynamic contrast-enhanced (DCE) magnetic resonance imaging (MRI) images acquired over a series of time periods, the method comprising:

receiving image data representing a ROI slice for each time period, from among the corresponding set of DCE MRI images, the image data representing the ROI slice including a plurality of voxels having a respective plurality of voxel locations, being representative of the ROI in the corresponding time period;

determining 2D or 3D textural features for the plurality of voxels in the ROI slice for each image at each time period in the series of time periods;

determining kinetic texture features for each of the voxel locations across all time periods in the series of time periods to represent spatio-temporal changes in the textural features at each voxel location across all of the time periods;

fitting a mathematical model to the determined kinetic texture features representing the changes in the textural features of each of the voxel locations;

determining parameter values of the mathematical model that is fitted to the spatio-temporal changes in texture for each of the voxel locations by selecting individual unpaired coefficients from the mathematical model as the determined parameters;

applying a classifier to the determined kinetic texture features and to the determined parameters of the mathematical model of changes in the spatio-temporal texture features to identify voxel locations corresponding to atherosclerotic plaques in the image and to classify the voxel locations corresponding to the plaques as stable or vulnerable; and visually indicating the classified voxel locations as determined by the classifier for at least a portion of voxel locations in the image.

4. A method according to claim 1, wherein the classifier includes at least one of a support vector machine (SVM), a C4.5 bagged classifier, a neural network, a hidden Markov Model process or frequent itemset mining.

5. A method according to claim 3, the method further including reducing a dimensionality of the classified result.

6. A method according to claim 3, the method further including, prior to the applying of the classifier, reducing a dependency among the kinetic texture features.

7. A method according to claim 3, wherein the step of fitting a mathematical model to the determined kinetic texture features includes:

determining a kinetic texture curve from the kinetic texture features; and fitting a polynomial to the kinetic texture curve to form a kinetic texture feature vector, and wherein the step of determining parameter value of the mathematical model includes extracting coefficients of the polynomial.

8. A non-transitory computer readable medium including computer program instructions configured to cause a processor to perform a method for classifying a region of interest (ROI) of a body from sets of dynamic contrast enhanced (DCE) magnetic resonance imaging (MRI) images acquired over a series of time period, the method comprising the steps of:

receiving image data representing a ROI slice for each time period, from among the corresponding set of DCE MRI images, the image data representing the ROI slice including a plurality of voxels having a respective plurality of voxel locations, being representative of the ROI in the corresponding time period;

determining 2D or 3D textural features for the plurality of voxels in the ROI slice for each image at each time period in the series of time periods;

determining kinetic texture features for each of the voxel locations across all time periods in the series of time periods to represent temporal changes in the textural features at each voxel location across all of the time periods;

fitting a mathematical model to the determined kinetic texture features representing the changes in the textural features of each of the voxel locations;

determining parameter values of the mathematical model that is fitted to these changes in texture for each of the voxel locations by selecting individual unpaired coefficients from the mathematical model as the determined parameters;

applying a classifier to the determined kinetic texture features and to the determined parameters of the mathematical model of changes in the spatio-temporal texture to identify voxel locations corresponding to atherosclerotic plaques in the image and to classify the voxel locations corresponding to the plaques as stable or vulnerable; and visually indicating the classified voxel locations as determined by the classifier for at least a portion of voxel locations in the image.

9. A method according to claim 3, wherein:

determining 2D or 3D texture features includes extracting quantitative features of the voxels of the ROI in each ROI slice; and determining the kinetic texture features includes modeling the extracted quantitative features to determine a behavior of each voxel across the series of time periods in the corresponding ROI slices.

10. A method according to claim 9, wherein the quantitative features include at least one of a first-order statistical feature, a second-order statistical feature or a gradient feature.

11. A method according to claim 10, wherein the first-order statistical feature includes at least one of a directional gradient operator, a mean, a median, a mode or a standard deviation of the respective voxel in terms of its neighboring voxels.

12. A method according to claim 10, wherein the second-order statistical feature includes at least one of a contrast energy, a contrast inverse moment, a contrast average, a contrast variance, a contrast entropy, an intensity average, an intensity variance, an intensity entropy, an entropy, an energy, a correlation or an information measure of the respective voxel in terms of its neighboring voxels.

13. A method according to claim 10, wherein the gradient feature includes at least one of a Sobel operator, a Kirsch operator, a derivative operator or a Gabor gradient operator.

14. A system for classifying voxel locations in a region of interest (ROI) in a body, comprising:
a processor, having an input port configured to receive dynamic contrast enhanced (DCE) magnetic resonance imaging (MRI) images acquired over a series of time periods, the processor being configured to:
receive image data representing an ROI slice for each time period, from among the corresponding set of DCE MRI images, the image data representing the ROI slice including a plurality of voxels having a respective plurality of voxel locations in the corresponding time period;
automatically extract a boundary of the ROI from each respective received ROI slice in the series of time periods,
determine 2D or 3D textural features for the plurality of voxels in the ROI slice for each image at each time period in the series of time periods;
determine kinetic texture features for each of the voxel locations across all time periods in the series of time periods to represent spatio-temporal changes in the textural features at each voxel location across all of the time periods, based on the respective extracted boundary of the ROI in each ROI slice;
fit a mathematical model to the determined kinetic texture features representing the changes in the textural features of each of the voxel locations;
determine parameter values of the mathematical model that is fitted to the spatio-temporal changes in texture for each of the voxel locations by selecting individual unpaired coefficients from the mathematical model as the determined parameters; and
apply a classifier to the determined kinetic texture features and to the determined parameters of the mathematical model of changes in the spatio-temporal texture features to identify voxel locations corresponding to atherosclerotic plaques in the image and to classify the voxel locations as stable or vulnerable; and
a display device for visually indicating the classified voxel locations as determined by the classifier for at least a portion of voxel locations in the ROI.

15. A system according to claim 14, wherein the processor is configured to automatically extract the boundary of the ROI by:
applying an expectation/maximization (EM) algorithm to group voxels of each received ROI slice in the series of time periods according to a number of statistical classes, and
applying an active contour model to each received ROI slice in the series of time periods to extract the respective boundary of the ROI for each time period, based on the respective grouped voxels.

16. A system according to claim 14, wherein:
the processor is configured to determine the 2D or 3D texture features of the ROI by extracting quantitative features of the voxels within the extracted boundary of the ROI in each ROI slice, and
the processor is configured to determine the kinetic texture features by modeling the extracted quantitative features to determine a behavior of each voxel across the series of time periods in the corresponding ROI slices.

17. A system according to claim 14, wherein the processor is configured to reduce a dimensionality of the classified result, and the display device is configured to display the classified result with the reduced dimensionality.

18. A method according to claim 1, wherein the identified abnormality is an arteriosclerotic plaque and the at least two classes include a stable plaque and a vulnerable plaque.

19. A method according to claim 1, wherein the identified abnormality is an arteriosclerotic plaque and the at least two classes include an acute vulnerable plaque and an intermediate vulnerable plaque.

20. A method according to claim 3, wherein the classifier further identifies the vulnerable plaques as acute vulnerable plaques and intermediate vulnerable plaques.

21. A system according to claim 14, wherein the processor further applies the classifier to identify the vulnerable plaques as acute vulnerable plaques and intermediate vulnerable plaques.

* * * * *